US012448723B2

(12) United States Patent
Kim

(10) Patent No.: US 12,448,723 B2
(45) Date of Patent: Oct. 21, 2025

(54) WASHING MACHINE WITH DRYER

(71) Applicant: SAMSUNG ELECTRONICS CO., LTD., Suwon-si (KR)

(72) Inventor: Younghyun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 137 days.

(21) Appl. No.: 18/533,002

(22) Filed: Dec. 7, 2023

(65) Prior Publication Data

US 2024/0209562 A1 Jun. 27, 2024

Related U.S. Application Data

(63) Continuation of application No. PCT/KR2023/018768, filed on Nov. 21, 2023.

(30) Foreign Application Priority Data

Dec. 21, 2022 (KR) ........................ 10-2022-0180980

(51) Int. Cl.

| | |
|---|---|
| ***D06F 58/20*** | (2006.01) |
| ***D06F 25/00*** | (2006.01) |
| ***D06F 58/24*** | (2006.01) |
| ***F26B 21/00*** | (2006.01) |

(52) U.S. Cl.

CPC ............ *D06F 58/203* (2013.01); *D06F 25/00* (2013.01); *D06F 58/206* (2013.01); *D06F 58/24* (2013.01); *F26B 21/005* (2013.01)

(58) Field of Classification Search

None

See application file for complete search history.

(56) References Cited

U.S. PATENT DOCUMENTS

| | | | |
|---|---|---|---|
| 8,181,492 | B2 | 5/2012 | Yang et al. |
| 8,695,230 | B2 | 4/2014 | Noh et al. |
| 2010/0132130 | A1 | 6/2010 | Moon et al. |
| 2011/0277334 | A1 | 11/2011 | Lee et al. |

(Continued)

FOREIGN PATENT DOCUMENTS

| | | |
|---|---|---|
| EP | 2471434 A1 | 7/2012 |
| EP | 2765235 A1 | 8/2014 |

(Continued)

OTHER PUBLICATIONS

International Search Report and Written Opinion of the International Searching Authority dated Feb. 26, 2024, in connection with International Application No. PCT/KR2023/018768, 11 pages.

*Primary Examiner* — Rita P Adhlakha

(57) ABSTRACT

A washing machine with a dryer is disclosed. The washing machine includes a cabinet wherein a laundry inlet is provided on a front surface thereof, a tub arranged inside the cabinet, and including a front opening and a rear opening connected with the laundry inlet, a drum configured to rotate inside the tub, a heat pump including an evaporator, a compressor, a condenser, and an expansion valve so as to heat air provided to an inside of the drum, a steam generator configured to spray water to the condenser and generate steam by heat generated from the condenser, and a blast fan arranged on a steam supply flow channel continued from the condenser to the drum, and configured to transfer the steam generated at the steam generator to the inside of the drum.

20 Claims, 10 Drawing Sheets

(56) References Cited

U.S. PATENT DOCUMENTS

| | | | |
|---|---|---|---|
| 2011/0280736 | A1 | 11/2011 | Lee et al. |
| 2011/0289794 | A1 | 12/2011 | Noh et al. |
| 2019/0352193 | A1 | 11/2019 | Lockwood et al. |

FOREIGN PATENT DOCUMENTS

| | | | |
|---|---|---|---|
| JP | 2013090815 | A | 5/2013 |
| JP | 2014113185 | A | 6/2014 |
| JP | 2014-150859 | A | 8/2014 |
| KR | 19970039170 | U | 7/1997 |
| KR | 100762337 | B1 | 10/2007 |
| KR | 20080101128 | A | 11/2008 |
| KR | 10-2010-0052206 | A | 5/2010 |
| KR | 20110119935 | A | 11/2011 |
| KR | 10-1306714 | B1 | 9/2013 |
| KR | 10-1387474 | B1 | 4/2014 |
| KR | 20190101729 | A | 9/2019 |
| KR | 10-2022-0114693 | A | 8/2022 |

WASHING MACHINE WITH DRYER

CROSS REFERENCE TO RELATED APPLICATIONS

The present application is a bypass continuation of International Application No. PCT/KR2023/018768 filed on Nov. 21, 2023, and claims priority to Korean Patent Application No. 10-2022-0180980 filed on Dec. 21, 2022, in the Korean Intellectual Property Office. The contents of the above applications are hereby incorporated by reference.

BACKGROUND

1. Field

The disclosure relates to a washing machine, and more particularly, to a washing machine with a dryer that can perform both washing and drying of laundry.

2. Description of the Related Art

In general, a washing machine washing laundry and a dryer drying laundry are formed as separate devices. Accordingly, a customer washes laundry by using a washing machine, and then dries the laundry of which washing is completed by using a dryer. In case a washing machine and a dryer are formed as separate devices, there is inconvenience for a user of having to wait until washing is completed, and then take out the laundry of which washing is completed from the washing machine and put the laundry into the dryer, and then proceed with drying.

For resolving such inconvenience, washing machines that perform both washing and drying are being developed and used. A washing machine with a dryer has a steam function for sterilization, and alleviation of crinkles and wrinkles of laundry. However, as a washing machine with a dryer includes a steam module including a separate heater for implementing such a steam function, there are problems that not only the product unit cost rises, but also the energy efficiency is reduced. Also, in a conventional washing machine with a dryer, a space for installing a steam module should be secured in the inside, and thus there is limitation in design of the inside of the washing machine.

SUMMARY

The disclosure is in consideration of the problems as above, and can provide a washing machine with a dryer that can implement a steam function without adding a separate heat source for a steam function.

A washing machine with a dryer according to one or more embodiments of the disclosure may include a cabinet wherein a laundry inlet is provided on a front surface thereof, a tub arranged inside the cabinet, and including a front opening and a rear opening connected with the laundry inlet, a drum configured to rotate inside the tub, a heat pump including an evaporator, a compressor, a condenser, and an expansion valve so as to heat air provided to an inside of the drum, a steam generator configured to spray water to the condenser and generate steam by heat generated from the condenser, and a blast fan arranged on a steam supply flow channel continued from the condenser to the drum, and configured to transfer the steam generated at the steam generator to the inside of the drum.

The steam generator may include a nozzle arranged on the upper side of the condenser, and is arranged to be slanted toward one side of the condenser to be adjacent to a space provided between the condenser and the blast fan.

The nozzle may include a housing arranged along a longitudinal direction of the condenser, a cover covering an opened upper part of the housing, and a nozzle plate that constitutes a bottom of the housing and wherein a plurality of spray holes are provided along a longitudinal direction of the housing.

The condenser may include a plurality of heat radiation plates arranged at a specific interval along the longitudinal direction of the condenser. Also, the plurality of spray holes may include a plurality of spray holes of a first row arranged at a specific interval along the longitudinal direction of the housing. In addition, each of the plurality of spray holes of the first row may be arranged between two adjacent heat radiation plates among the plurality of heat radiation plates.

The plurality of spray holes of the first row may be arranged toward an inside of the condenser based on edges of the plurality of heat radiation plates.

The plurality of spray holes may further include a plurality of spray holes of a second row arranged more toward the inside of the condenser than the plurality of spray holes of the first row.

The plurality of spray holes of the second row may respectively correspond to the plurality of spray holes of the first row.

A number of the plurality of spray holes of the second row may be fewer than a number of the plurality of spray holes of the first row.

Each of the plurality of spray holes of the second row may be arranged between two adjacent heat radiation plates.

The plurality of spray holes of the second row may be shifted toward one side with respect to the plurality of spray holes of the first row.

An interval of the two adjacent heat radiation plates may be from 1.5 mm to 2.5 mm.

The diameters of the plurality of spray holes of the first row may be from 0.2 mm to 1.0 mm.

The washing machine with a dryer according to one or more embodiments of the disclosure may include a cabinet, a tub arranged inside the cabinet, and wherein a front opening and a rear opening connected with a laundry inlet of the cabinet are provided, a drum configured to rotate inside the tub, a heat pump configured to heat air provided to the inside of the drum, a steam generator that includes a plurality of spray holes spraying water to some parts of the heat pump, and configured to generate steam by heat generated from some parts of the heat pump, and a blast fan configured to transfer the steam generated at the steam generator to the inside of the drum. Also, some parts of the heat pump may include a plurality of heat radiation plates arranged at a specific interval along a longitudinal direction. In addition, each of the plurality of spray holes may be arranged between two adjacent heat radiation plates among the plurality of heat radiation plates.

The plurality of spray holes may be arranged toward the inside of some parts of the heat pump based on edges of the plurality of heat radiation plates.

The steam generator may further include a plurality of additional spray holes of at least one row which are arranged farther from the edges of the plurality of heat radiation plates than the plurality of spray holes.

Before undertaking the DETAILED DESCRIPTION below, it may be advantageous to set forth definitions of certain words and phrases used throughout this patent document: the terms “include” and “comprise,” as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The description below with reference to the accompanying drawings is provided for promoting comprehensive understanding of various embodiments of the disclosure as defined by the claims and the equivalents thereof. Here, various specific details for promoting understanding are included, but the details should be regarded as just exemplary ones. Accordingly, a person having ordinary knowledge in the technical field to which the disclosure belongs would be able to recognize that various modifications and amendments may be made to the various embodiments described in this specification, without departing from the scope and idea of the disclosure. Also, for clarity and conciseness, description regarding well-known functions and components may be omitted.

In addition, the terms and words used in the description below and the claims are not limited to bibliographical meanings, and were just used by the inventor to enable clear and consistent understanding of the disclosure. Accordingly, it would be clear to a person having ordinary knowledge in the technical field to which the disclosure belongs that the description below regarding the various embodiments of the disclosure is provided just for the purpose of exemplification, and is not for limiting the disclosure as defined in the appended claims and the equivalents thereof.

Further, terms such as "first," "second" and the like may be used to describe various elements, but they are not intended to limit the elements. The terms may be used only to distinguish one element from another element. For example, a first element may be called a second element, and a second element may be called a first element in a similar manner, without departing from the scope of the disclosure.

Also, the terms used in the embodiments of the disclosure may be interpreted as meanings generally known to a person having ordinary knowledge in the technical field to which the disclosure belongs, unless defined differently in the disclosure.

In addition, the terms 'front end,' 'rear end,' 'upper part,' 'lower part,' 'upper end,' 'lower end,' etc. used in the disclosure are defined based on the drawings, and the form and the location of each component are not to be limited by the terms.

Hereinafter, a washing machine with a dryer according to one or more embodiments of the disclosure will be described with reference to the accompanying drawings.

Figure 1:
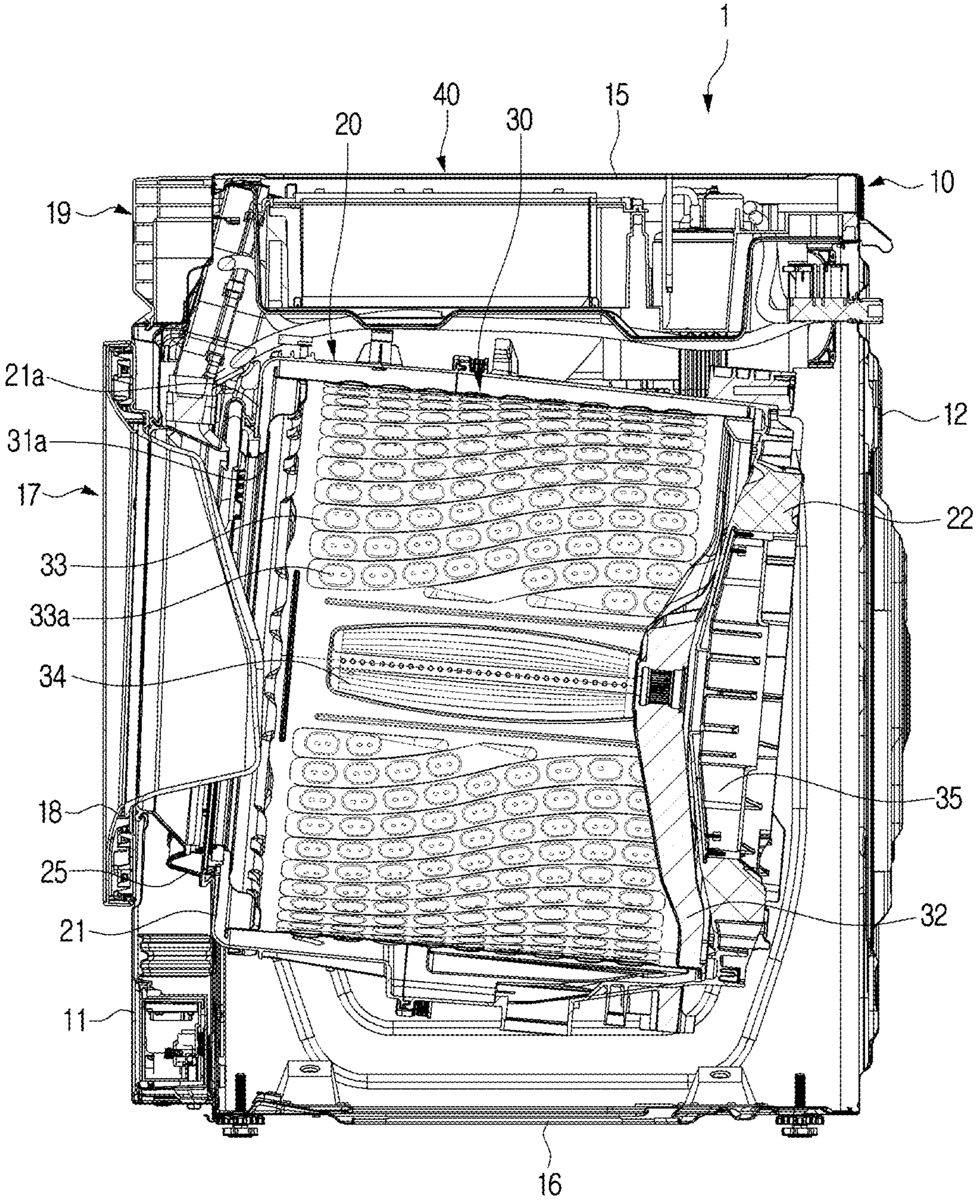
FIG. 1 is a cross-sectional view illustrating a washing machine with a dryer according to one or more embodiments of the disclosure.

FIG. 1 is a cross-sectional view illustrating a washing machine with a dryer according to one or more embodiments of the disclosure.

Referring to FIG. 1, a washing machine 1 with a dryer according to one or more embodiments of the disclosure may include a cabinet 10, a tub 20, a drum 30, a hot wind supply 40, and a steam generator 100.

The cabinet 10 forms the exterior of the washing machine 1 with a dryer, and is formed approximately in the shape of a cuboid. The cabinet 10 may include a front surface cover 11, a rear surface cover 12, a left side cover, a right side cover, an upper cover 15, and a lower cover 16.

On the front surface of the cabinet 10, a laundry inlet 18 through which laundry can be put into and taken out from the inside of the cabinet 10 is provided. For example, the laundry inlet 18 may be formed on the front surface cover 11 of the cabinet 10.

On the laundry inlet 18, a door 17 is installed to be openable. In the upper part of the front surface cover 11 of the cabinet 10, a control panel 19 that can control the washing machine 1 may be provided. The control panel 19 may include a plurality of buttons for controlling the washing machine 1, a display for showing information related to the washing machine 1 and a washing process, and a processor controlling the washing machine.

The tub 20 may be installed inside the cabinet 10, and may be formed in a cylindrical shape with a hollow on which a front opening 21*a* is provided toward the laundry inlet 18 of the front surface cover 11. The front opening 21*a* of the tub 20 may be formed as a size corresponding to the laundry inlet 18. On the rear end of the tub 20, a rear surface plate 22 is provided. On the rear surface plate 22, a rear opening through which air inside the tub 20 is discharged may be provided.

The tub 20 may accommodate washing water of a specific amount that is necessary for washing. The tub 20 may be supported and fixed on the inner surface of the cabinet 10 by a tension spring, an oil damper, etc.

Between the tub 20 and the front surface cover 11 of the cabinet 10, a diaphragm 25 may be installed. The diaphragm 25 may be formed approximately in the shape of a ring. One end of the diaphragm 25 may be fixed on the front surface 21 of the tub 20 on which the front opening 21*a* is provided, and the other end of the diaphragm 25 may be fixed on the inner circumference of the laundry inlet 18 of the front surface cover 11 of the cabinet 10.

The diaphragm 25 may prevent the washing water accommodated in the tub 20 from leaking to the outside of the tub 20, and may form a passage through which the washing water passes. Also, the diaphragm 25 may block vibration generated when the drum 30 rotates from being transmitted to the front surface cover 11 of the cabinet 10 through the tub 20.

The drum 30 may be installed to be rotatable inside the tub 20, and may be formed approximately in the shape of a cylinder with a hollow. On the front surface of the drum 30, a drum opening 31*a* corresponding to the laundry inlet 18 of the cabinet and the front opening 21*a* of the tub may be provided, and on the rear end of the drum 30, a rear surface plate 32 may be provided.

A plurality of through holes 33*a* through which washing water can pass are provided on the side surface 33 of the drum 30. A plurality of through holes may also be provided on the rear surface plate 32 of the drum 30. Accordingly, air inside the drum may be discharged to the space between the drum 30 and the tub 20 through the plurality of through holes 33*a* provided on the side surface 33, and the plurality of through holes formed on the rear surface plate 32 of the drum 30.

a plurality of lifts 34 that can raise the laundry may be provided on the inner circumferential surface of the drum 30. The drum 30 may rotate centered around a central axis by a driving device including a driving motor 35 installed on the rear surface plate 32.

A water supply device for supplying water to the tub 20 may be provided in the upper part of the tub 20, and a draining device for draining water from the tub 20 to the outside may be arranged in the lower part of the tub 20.

The water supply device may include a water supply pipe connected with an external water supplying source, and a water supply valve opening or closing the water supply pipe. One end of the water supply pipe may be connected to the diaphragm 25. A detergent suctioning part may be provided In the water supply pipe. The water supply device may include a pipe 101 (refer to FIG. 4) for supplying direct water provided from the external water supplying source to the steam generator 100 (refer to FIG. 4).

The draining device may be formed such that it can discharge washing water accommodated in the tub 20 to the outside of the washing machine 1 with a dryer. The draining device may be installed in the lower part of the tub 20, and may include a pump and a draining pipe. When the pump operates, the washing water accommodated in the tub 20 may be discharged to the outside of the washing machine 1 through the draining pipe.

A hot wind supply 40 for drying laundry washed by the rotation of the drum 30 may be installed on the upper side of the tub 20. The hot wind supply 40 may be formed such that it can heat and dry the air discharged from the tub 20 and make it hot wind, and circulate the hot wind to the inside of the tub 20 and thereby dry the laundry located inside the drum 30. The hot wind may be the air heated and dried by the hot wind supply 40.

Figure 2:
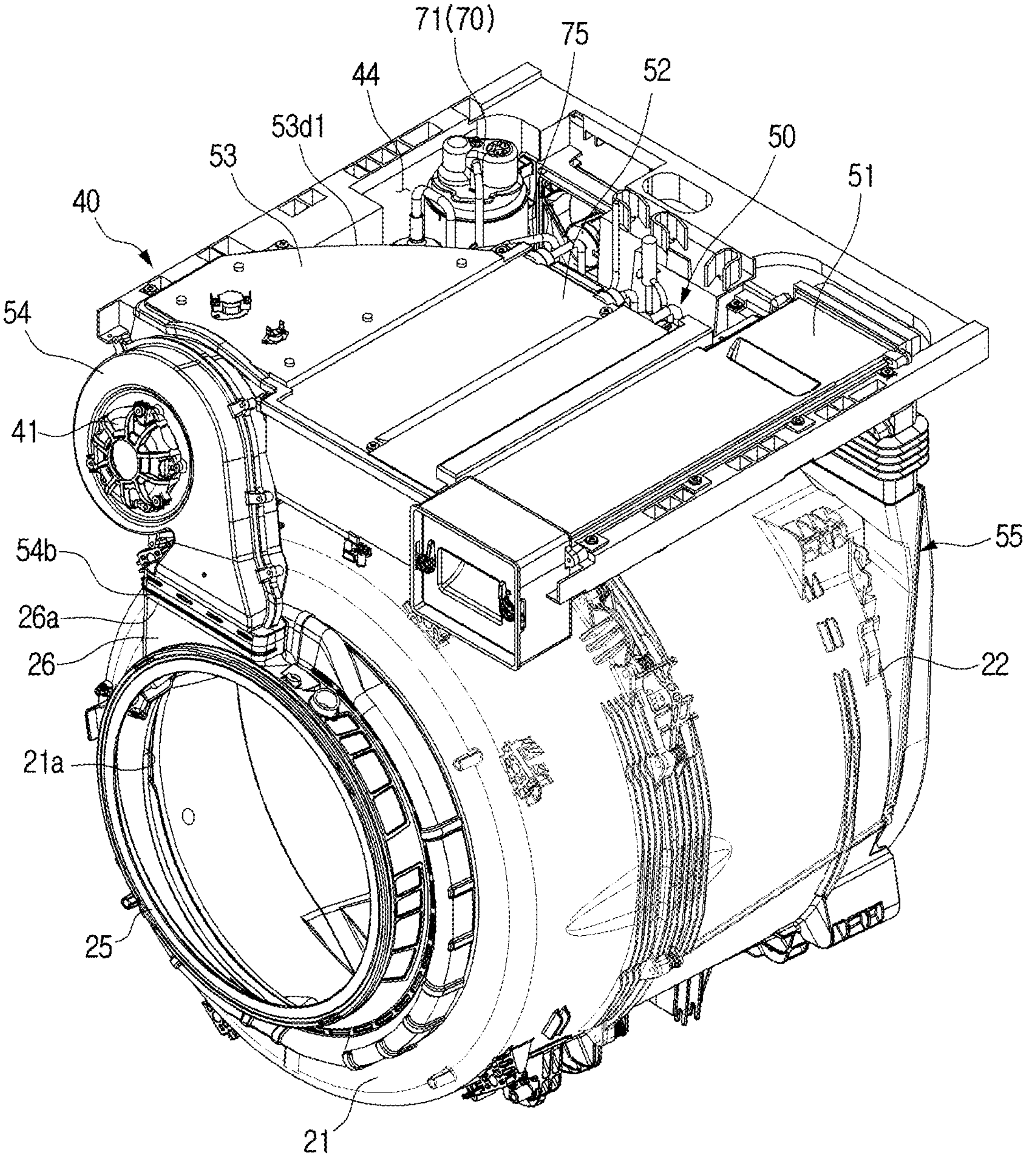
FIG. 2 is a perspective view illustrating a washing machine with a dryer according to one or more embodiments of the disclosure.
Figure 3:
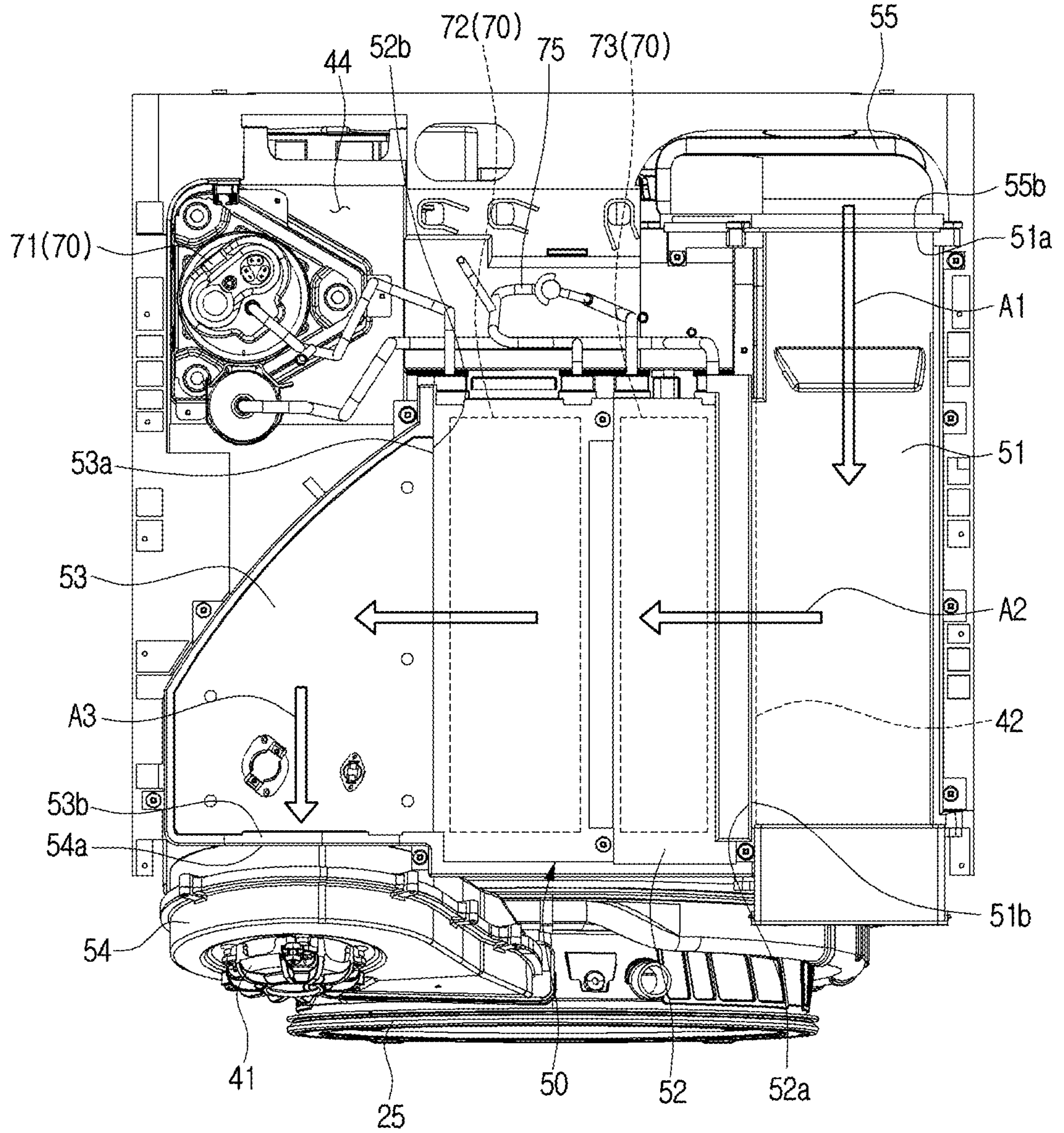
FIG. 3 is a plan view illustrating a washing machine with a dryer according to one or more embodiments of the disclosure.

FIG. 2 is a perspective view illustrating a washing machine 1 with a dryer according to one or more embodiments of the disclosure. FIG. 3 is a plan view illustrating a washing machine 1 with a dryer according to one or more embodiments of the disclosure.

Referring to FIGS. 2 and 3, the hot wind supply 40 may be installed on the upper side of the tub 20, and may be formed such that it can dry the laundry washed by the rotation of the drum 30. Also, the hot wind supply 40 may be formed such that it can heat and dry the air discharged from the tub 20 and form hot wind, and circulate the hot wind to the inside of the tub 20 and thereby dry the laundry located inside the drum 30.

The hot wind supply 40 may include an upper duct 50 provided on the upper side of the tub 20, a rear duct 55 provided on the rear surface of the tub 20, a blast fan 41 generating a circulating air current, and a heat pump 70 removing moisture included in an air current, and heating the air current. The heat pump 70 may perform a heat pump cycle for heat exchange.

The upper duct 50 may be formed to connect the rear duct 55 and the blast fan 41 installed on the front side of the tub 20. The upper duct 50 may be formed approximately in an L shape.

An inlet through which air discharged from the tub 20 is introduced may be provided on the rear surface of the upper duct 50, and an outlet discharging air may be provided on the front surface of the upper duct 50. Here, the front surface and the rear surface of the upper duct 50 may be surfaces respectively corresponding to the front surface cover 11 and the rear surface cover 12 of the cabinet 10.

The upper duct 50 may be formed such that an air current introduced from the rear side is bent in an orthogonal direction, and then moves by a specific distance in a straight line, and is then bent in an orthogonal direction again and discharged to the outside toward the front side of the cabinet 10. For example, the upper duct 50 may form an upper flow channel that guides an air current such that the air current introduced from the rear side is bent in an orthogonal direction, and then moves by a specific distance via some parts (e.g., the condenser 72 and the evaporator 73) of the heat pump 70 in a straight line, and is then bent in an orthogonal direction again and discharged to the outside toward the front side of the cabinet 10.

The upper duct 50 may be installed to be adjacent to the front surface 21 of the tub 20. Accordingly, between the rear surface of the tub 20 and the upper duct 50 in the upper space of the tub 20, a space 44 wherein the compressor 71 of the heat pump 70 can be installed may be provided. Here, the front surface 21 of the tub 20 may be the surface on which the front opening 21*a* is formed. Also, one side of the tub 20 may be the left side or the right side based on the front surface 21 of the tub 20, and the other side of the tub 20 may be the opposite side of the one side of the tub 20 based on the front surface 21 of the tub 20.

An inlet 51*a* of the upper duct 50 may be provided to be adjacent to one side and the rear surface of the tub 20. Also, the inlet 51*a* of the upper duct 50 may be in communication with an outlet 55*b* of the rear duct 55. Accordingly, the air discharged from the tub 20 may be introduced into the upper duct 50 in a direction toward the front side from the rear side of the tub 20. Also, the duct 53 of the upper duct 50 may be provided to be adjacent to the other side and the front surface 21 of the tub 20. Accordingly, the air discharged from the upper duct 50 may be discharged toward the front side of the tub 20.

The inlet 51*a* and an outlet 53*b* of the upper duct 50 may be provided in a diagonal direction on the upper side of the tub 20. For example, the inlet 51*a* of the upper duct 50 may be provided on the corner of one side of the tub 20, and the outlet 53*b* of the upper duct 50 may be provided on the corner of the other side of the tub 20 that is located on the opposite side in a diagonal direction.

A blast fan 41 may be installed on the outlet 53*b* of the upper duct 50. The blast fan 41 may be accommodated inside a blast duct 54 connecting the upper duct 50 and the tub 20. An inlet 54*a* of the blast duct 54 may be formed such that it can suction air discharged from the outlet 53*b* of the upper duct 50 to the front side. An outlet 54*b* of the blast duct 54 may be provided such that it can discharge an air current toward the diaphragm 25.

The upper duct 50 may include an inlet duct 51, a heat exchange duct 52, and a supply duct 53.

The inlet duct 51 may be provided to be adjacent to one side of the tub 20 on the upper side of the tub 20, and may be formed such that an air current discharged from the rear opening 22*a* of the rear surface plate 22 of the tub 20 can be introduced. Also, the inlet duct 51 may be formed such that an introduced air current flows in a straight line.

The inlet 51*a* of the inlet duct 51 may be connected with the outlet 55*b* of the rear duct 55. Also, the inlet 51*a* of the inlet duct 51 may form the inlet 51*a* of the upper duct 50. In addition, the inlet 51*a* of the inlet duct 51 may be provided on the rear end of the inlet duct 51, and an outlet 51*b* of the inlet duct 51 may be provided on the side surface contacting the heat exchange duct 52 that falls under one side surface of the inlet duct 51. Accordingly, the outlet 51*b* of the inlet duct 51 may constitute a right angle with the inlet 51*a* of the inlet duct 51.

A lint filter 42 may be installed on the inlet duct 51. The lint filter 42 may be installed to be separable from the inlet duct 51. Also, the lint filter 42 may be installed to be detachable from the inlet duct 51 on the front side of the tub 20.

The outlet 51*b* of the inlet duct 51 may be formed to be bigger compared to the inlet 51*a*. For example, the outlet 51*b* of the inlet duct 51 may be formed to be bigger by two times or more than the inlet 51*a* of the inlet duct 51. If the outlet 51*b* of the inlet duct 51 is made to be bigger than the inlet like this, the size of the lint filter 42 installed on the outlet 51*b* of the inlet duct 51 may be made to be big. The lint filter 42 may be formed in a size corresponding to an inlet 52*a* of the heat exchange duct 52. If the size of the lint filter 42 is made to be big, duct resistance by the lint filter 42 can be reduced.

The inlet duct 51 may have a rectangular cross-section. Also, the rear end of the inlet duct 51 may be connected to the rear duct 55. For example, the inlet 51*a* may be provided on the rear surface of the inlet duct 51.

The inlet duct 51 may be installed to be adjacent to one side of the tub 20 on the upper side of the tub 20. Also, the front surface of the inlet duct 51 may be installed to be adjacent to the front surface 21 of the tub 20, and the rear surface may be installed to be adjacent to the rear surface of the tub 20.

The outlet 51*b* may be provided on one side surface of the inlet duct 51. The outlet 51*b* of the inlet duct 51 may be formed in a shape and a size corresponding to the inlet 52*a* of the heat exchange duct 52. The outlet 51*b* of the inlet duct 51 and the inlet 52*a* of the heat exchange duct 52 may be formed in rectangular shapes. The outlet 51*b* of the inlet duct 51 may be formed to be identical to or bigger than the size of the inlet 52*a* of the heat exchange duct 52. Also, the width of the outlet 51*b* of the inlet duct 51 may be shorter than the length of the inlet duct 51.

An air current introduced into the inlet 51*a* of the inlet duct 51 may pass through the lint filter 42 installed on the outlet 51*b*, and may be introduced into the inlet 52*a* of the heat exchange duct 52.

The heat exchange duct 52 may be provided approximately in a right angle with respect to the inlet duct 51 on the upper side of the tub 20, and may be connected to one side of the inlet duct 51. Also, the heat exchange duct 52 may be formed such that an introduced air current can flow in a straight line.

The width of the heat exchange duct 52 may be made to be as big as possible, so that the heat transfer area can be maximized. However, the width of the heat exchange duct 52 is smaller than the length of the inlet duct 51. For example, the width of the heat exchange duct 52 may be formed to be half or more of the length of the tub 20. Accordingly, a part of the inlet duct 51 may protrude toward the rear surface cover 12 of the cabinet 10 from the rear surface of the heat exchange duct 52.

The inlet 52*a* of the heat exchange duct 52 may be provided on one end of the heat exchange duct 52, and the outlet 52*b* of the heat exchange duct 52 may be provided on the other end of the heat exchange duct 52. Accordingly, the inlet 52*a* and the outlet 52*b* of the heat exchange duct 52 may be provided to face each other in a straight line. Also, the inlet 52*a* and the outlet 52*b* of the heat exchange duct 52 may be formed to be identical to the cross-section of the heat exchange duct 52.

The inlet 52*a* of the heat exchange duct 52 may be connected with the outlet 51*b* of the inlet duct 51. The outlet 51*b* of the inlet duct 51 may be formed in a shape and a size corresponding to the inlet 52*a* of the heat exchange duct 52.

The heat exchange duct 52 may have a rectangular cross-section, and both side ends of the heat exchange duct 52 may be opened. Also, the heat exchange duct 52 may be formed to have a big cross-sectional area as much as possible such that the heat transfer area can become the biggest as possible.

Also, the heat exchange duct 52 may be connected with the inlet duct 51 in a right angle. Accordingly, the central line in the longitudinal direction of the heat exchange duct 52 and the central line in the longitudinal direction of the inlet duct 51 may be connected to constitute a right angle.

The inlet 52*a* of the heat exchange duct 52 may be connected with the outlet 51*b* of the inlet duct 51. The outlet 51*b* of the inlet duct 51 may be formed in a shape and a size corresponding to the inlet 52*a* of the heat exchange duct 52.

The heat exchange duct 52 may be arranged on the upper side of the tub 20 such that its front surface is adjacent to the front surface 21 of the tub 20. The rear surface of the heat exchange duct 52 may be spaced apart from the rear surface of the tub 20 by a specific distance.

The evaporator 73 and the condenser 72 of the heat pump 70 may be arranged on the inside of the heat exchange duct 52. Accordingly, an air current flowing in the heat exchange duct 52 may sequentially pass through the evaporator 73 and the condenser 72.

The supply duct 53 may be provided to be adjacent to the other side of the tub 20 on the upper side of the tub 20, and may be formed to discharge an air current introduced from the heat exchange duct 52 to the blast fan 41. The supply duct 53 may be connected with the heat exchange duct 52 approximately in a right angle. Also, the supply duct 53 may be formed such that an introduced air current flows in a straight line.

An inlet 53*a* of the supply duct 53 may be connected with the outlet 52*b* of the heat exchange duct 52. Also, the inlet 53*a* of the supply duct 53 may be provided on the side surface contacting the heat exchange duct 52 that falls under one side surface of the supply duct 53. Further, the inlet 53*a* of the supply duct 53 may be provided in a shape and a size corresponding to the outlet 52*b* of the heat exchange duct 52.

The outlet 53*b* of the supply duct 53 may be formed on the front surface of the supply duct 53, and may be provided approximately in a right angle with respect to the inlet 53*a* of the supply duct 53. Also, the outlet 53*b* of the supply duct 53 may be connected with the suction hole of the blast fan 41, i.e., the inlet 54*a* of the blast duct 54. The outlet 53*b* of the supply duct 53 may form the outlet 53*b* of the upper duct 50.

Also, the outlet 53*b* of the supply duct 53 may be formed such that it can discharge air toward the front side of the tub 20. Accordingly, air may be discharged in a direction that is approximately perpendicular to the front surface of the cabinet 10 from the outlet 53*b* of the supply duct 53.

For example, the outlet 53*b* of the supply duct 53 and the inlet 54*a* of the blast duct 54 falling under the suction hole of the blast fan 41 installed on the front side of the tub 20 may be formed such that an air current discharged from the outlet 53*b* of the supply duct 53 can be suctioned into the blast fan 41 in a straight line.

The supply duct 53 may have an approximately rectangular cross-section, and its front end may be connected with the blast fan 41. Accordingly, on the front end of the supply duct 53, the outlet 53*b* may be provided. The outlet 53*b* of the supply duct 53 may be formed in a shape and a size corresponding to the suction hole of the blast fan 41.

The supply duct 53 may be arranged to be adjacent to the other side of the tub 20 on the upper side of the tub 20. The front surface of the supply duct 53 may be arranged to be adjacent to the front surface 21 of the tub 20, and the rear surface may be arranged to be spaced apart from the rear surface of the tub 20 by a specific distance.

The supply duct 53 may be connected with the heat exchange duct 52 approximately in a right angle. Accordingly, the central line in the longitudinal direction of the heat exchange duct 52 and the central line in the longitudinal direction of the supply duct 53 may be connected to constitute a right angle.

The inlet 53*a* may be provided on one side surface of the supply duct 53. The inlet 53*a* of the supply duct 53 may be formed in a shape and a size corresponding to the outlet 52*b* of the heat exchange duct 52. For example, the inlet 53*a* of the supply duct 53 and the outlet 52*b* of the heat exchange duct 52 may be formed in rectangular shapes. Also, the length of the supply duct 53 may be formed in an approximately identical length to the width of the heat exchange duct 52.

The rear surface and the other side surface of the supply duct 53 may be connected to an inclined surface 53*d*1. Accordingly, an air current introduced into the inlet 53*a* of the supply duct 53 may collide with the inclined surface 53*d*1, and may be discharged to the outlet 53*b* of the supply duct 53. If the inclined surface 53*d*1 is installed on the supply duct 53 like this, an air current introduced into the supply duct 53 can be effectively guided to the outlet 53*b*. As another example, the inclined surface 53*d*1 of the supply duct 53 may also be formed as a curved surface that can guide an air current introduced into the inlet 53*a* to the outlet 53*b*.

The front surface of the inlet duct 51, the front surface of the heat exchange duct 52, and the front surface of the supply duct 53 may be located on an approximately identical plane. Also, between one side surface of the inlet duct 51, the rear surface of the heat exchange duct 52, the rear surface of the supply duct 53, and the rear surface of the tub 20, a space 44 may be formed. In the space 44, the compressor 71 of the heat pump 70, an expansion valve, and a refrigerant pipe 75 may be installed.

The rear duct 55 may be provided on the rear surface plate 22 of the tub 20, and may be formed such that it guides an air current discharged from the tub 20 to the upper side of the tub 20. On the rear surface plate 22 of the tub 20, a rear opening 22*a* from which an air current is discharged may be provided. The inlet of the rear duct 55 may be connected with the rear opening 22*a* of the tub 20.

The outlet 55*b* of the rear duct 55 may be provided to be slanted to one side on the rear surface of the tub 20, and may be connected with the inlet 51*a* of the inlet duct 51. Also, the outlet 55*b* of the rear duct 55 may be formed in a size and a shape corresponding to the inlet 51*a* of the inlet duct 51. Accordingly, air discharged from the rear opening 22*a* of the tub 20 may be introduced into the inlet duct 51 through the rear duct 55.

The blast fan 41 may be formed such that it forms a flow of air, i.e., an air current so that air discharged from the supply duct 53 can be supplied to the front opening 21*a* of the tub 20.

The blast fan 41 may be installed on the front surface 21 of the tub 20. Also, the blast fan 41 may be formed such that an air current is introduced into the rear surface, and is discharged to the bottom surface. That is, the blast fan 41 may be formed such that a discharging direction of an air current and an introducing direction of the air current constitute approximately 90 degrees. Accordingly, when the blast fan 41 operates, air discharged from the outlet of the supply duct 53 toward the front side of the tub 20 may be introduced into the blast fan 41, and the air may be discharged from the blast fan 41 downward toward the diaphragm 25.

The blast fan 41 may be accommodated inside the blast duct 54. The blast duct 54 may be installed on the front surface 21 of the tub 20, and may connect the supply duct 53 and the diaphragm 25. Accordingly, air discharged from the supply duct 53 may be supplied to the inside of the diaphragm 25 through the blast duct 54.

The blast duct 54 may be formed such that an air current discharged from the blast fan 41 can be supplied to the diaphragm 25 located below. Also, the blast duct 54 may be formed such that an air current formed by the blast fan 41 is provided to the inside of the diaphragm 25 in a straight line.

The inlet 54*a* of the blast duct 54 is provided on the rear surface, and forms the suction hole of the blast fan 41. Also, the inlet 54*a* of the blast duct 54 may be connected with the outlet 53*b* of the supply duct 53. The inlet 54*a* of the blast duct 54 and the outlet 53*b* of the supply duct 53 may be located on a straight line. Accordingly, the inlet 54*a* of the blast duct 54 may be directly connected to the outlet 53*b* of the supply duct 53.

The outlet 54*b* of the blast duct 54 may be provided on the bottom surface of the blast duct 54, and may be connected with the inlet of the diaphragm 25. The outlet 54*b* of the blast duct 54 and the inlet of the diaphragm 25 may be located on a straight line. Accordingly, the outlet 54*b* of the blast duct 54 may be directly connected to the inlet of the diaphragm 25.

A connection part 26 to which the blast duct 54 is connected may be provided in the upper part of the diaphragm 25. The connection part 26 may be formed in a shape and a size corresponding to the bottom surface of the blast duct 54, and in its inside, an inlet 26*a* corresponding to the outlet 54*b* of the blast duct 54 may be provided.

Accordingly, an air current discharged by the blast fan 41 may be introduced into the inside of the diaphragm 25, i.e., the inside of the drum 30 in a straight line through the blast duct 54 and the connection part 26.

As the blast fan 41, a sirocco fan may be used. When the blast fan 41 rotates, air may be suctioned into the inlet of the blast duct 54, and then the air may be discharged to the outlet 54*b* provided on the bottom surface of the blast duct 54. Accordingly, the direction of an air current discharged from the outlet 54*b* of the blast duct 54 constitutes approximately 90 degrees with the direction of the air current suctioned into the inlet 54*a* of the blast duct 54.

The heat pump 70 may be formed such that it can remove the moisture of air that passes through the heat exchange duct 52 and heat the air, and thereby make it dry air of a high temperature. The heat pump 70 may be formed as a heat pump.

The heat pump 70 may include a compressor 71, an evaporator 73, a condenser 72, and an expansion valve. Also, the heat pump 70 may include a refrigerant pipe 75 that connects the compressor 71, the evaporator 73, the condenser 72, and the expansion valve, and makes the refrigerant circulate.

The heat pump 70 may be formed such that a refrigerant circulates the condenser 72, the expansion valve, and the evaporator 73 by the compressor 71, and moisture included in the air is removed through heat exchange with the air, and the air is heated.

The evaporator 73 and the condenser 72 may be installed on the heat exchange duct 52. The evaporator 73 and the condenser 72 may be installed inside the heat exchange duct 52 so that they are spaced apart by a specific distance. The condenser 72 may be installed in the downstream of the evaporator 73 in a circulating direction of an air current.

The evaporator 73 may be installed to be adjacent to the inlet duct 51, and may cool humid air discharged from the tub 20 and remove the moisture.

The condenser 72 may be installed to be adjacent to the supply duct 53, and heat the air that passed through the evaporator 73. Accordingly, dried air of a high temperature may be discharged to the diaphragm 25 by the blast fan 41.

The compressor 71 may be arranged on the outer side of the supply duct 53 on the upper side of the tub 20. The compressor 71 may be arranged in the space 44 between the supply duct 53 and the rear surface of the tub 20. The refrigerant pipe 75 may be arranged in the space 44 formed by the inlet duct 51, the heat exchange duct 52, the supply duct 53, and the rear surface of the tub 20 on the upper side of the tub 20.

The inlet duct 51, the heat exchange duct 52, the supply duct 53, the rear duct 55, and the blast duct 54 may respectively form an inlet flow channel, a heat exchange flow channel, a supply flow channel, a rear flow channel, and a blast flow channel.

For example, the inner space of the inlet duct 51 forms an inlet flow channel, the inner space of the heat exchange duct 52 forms a heat exchange flow channel, and the inner space of the supply duct 53 forms a supply flow channel. Also, the inner space of the rear duct 55 may form a rear flow channel, and the inner space of the blast duct 54 may form a blast flow channel.

The inlet flow channel, the heat exchange flow channel, and the supply flow channel may form an upper flow channel provided on the upper side of the tub 20. Accordingly, the tub 20, the rear flow channel provided on the rear surface of the tub 20, the upper flow channel provided on the upper side of the tub 20, and the blast flow channel provided on the front surface of the tub 20 may form a circulation flow channel. Accordingly, when the blast fan 41 arranged on the blast flow channel operates, the air inside the drum 30 may circulate according to the circulation flow channel.

For example, humid air in the drum 30 is discharged to the space between the rear surface plate 32 of the drum 30 and the rear surface plate 22 of the tub 20 through the plurality of through holes on the rear surface plate 32 of the drum 30. The humid air discharged to the space between the rear surface plate 32 of the drum 30 and the rear surface plate 22 of the tub 20 is introduced into the rear duct 55 through the rear opening 22*a* of the tub 20. The humid air introduced into the rear duct 55 is discharged to the inlet duct 51 through the outlet 55*b*.

The humid air A1 introduced into the inlet 51*a* of the inlet duct 51 flows in an approximately perpendicular direction to the front surface cover 11 of the cabinet 10, i.e., the front surface 21 of the tub 20. The humid air introduced into the inlet duct 51 is discharged to the heat exchange duct 52 through the lint filter 42. Here, foreign substances such as lint, etc. contained in the humid air can be filtered by the lint filter 42.

The humid air introduced into the inlet 52*a* of the heat exchange duct 52 flows in a parallel direction to the front surface cover 11 of the cabinet 10. For example, the air A2 flowing in the heat exchange duct 52 constitutes approximately a right angle with the air A1 flowing in the inlet duct 51. The moisture of the humid air introduced into the inlet 52*a* of the heat exchange duct 52 is removed as the air passes through the evaporator 73. The air from which moisture is removed is heated as it passes through the condenser 72. Accordingly, from the outlet 52*b* of the heat exchange duct 52, dry air of a high temperature is discharged to the supply duct 53.

The dry air of a high temperature introduced into the inlet 53*a* of the supply duct 53 flows in an approximately perpendicular direction to the front surface cover 11 of the cabinet 10. For example, the air A3 flowing in the supply duct 53 constitutes approximately a right angle with the air A2 flowing in the heat exchange duct 52, and is approximately parallel to the air A1 flowing in the inlet duct 51.

The air discharged from the outlet 53*b* of the supply duct 53 is introduced into the suction hole of the blast fan 41, i.e., the inlet 54*a* of the blast duct 54. Here, the outlet 53*b* of the supply duct 53 and the inlet 54*a* of the blast duct 54 are arranged in a straight line, and thus flow channel resistance of the air introduced into the blast fan 41 can be minimized.

The blast duct 54 discharges the dry air of a high temperature suctioned into the inlet 54*a* to the downside toward the diaphragm 25 through the outlet 54*b*. Here, the direction of the air discharged from the outlet 54*b* of the blast duct 54 constitutes approximately a right angle with the direction of the air suctioned into the inlet 54*a*.

The dry air of a high temperature discharged from the outlet 54*b* of the blast duct 54 is introduced into the inside of the diaphragm 25 through the connection part 26. Here, the outlet 54*b* of the blast duct 54 and the connection part 26 are arranged in a straight line, and thus the dry air of a high temperature discharged by the blast fan 41 is introduced into the inside of the diaphragm 25 in a straight line. As the diaphragm 25 is in communication with the drum opening 31*a* provided on the front surface of the drum 30, the dry air of a high temperature is introduced into the inside of the drum 30 through the diaphragm 25.

The dry air of a high temperature introduced into the inside of the drum 30 contacts laundry and dries the laundry. By drying of the laundry, the dry air of a high temperature becomes humid air of a low temperature. The humid air inside the drum 30 is discharged to the rear duct 55 through the plurality of through holes on the rear surface plate 32 of the drum 30, and gets to continue the aforementioned circulation.

Figure 4:
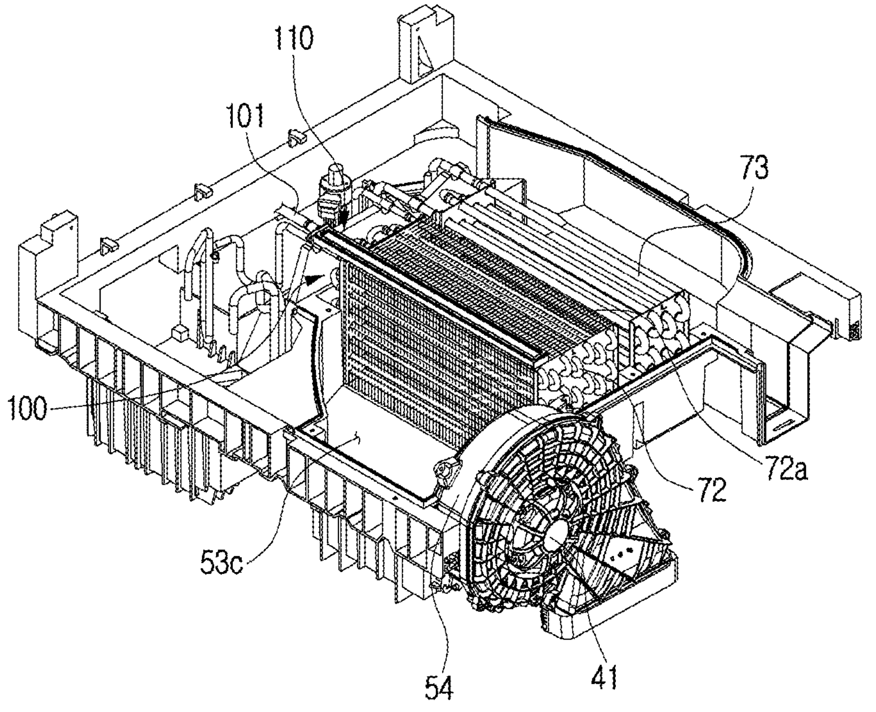
FIG. 4 is a perspective view illustrating a steam generator of a washing machine with a dryer according to one or more embodiments of the disclosure.

FIG. 4 is a perspective view illustrating a steam generator of a washing machine 1 with a dryer according to one or more embodiments of the disclosure.

Referring to FIG. 4, the steam generator 100 may not include an additional heat source for generating steam, but use the condenser 72 of the heat pump 70 as a heat source. For example, the steam generator 100 may include the condenser 72, and a nozzle 110 arranged in the upper part of the condenser 72.

The condenser 72 may emit intense heat as the refrigerant gas of a high temperature and a high pressure discharged from the compressor 71 is condensed. The condenser 72 may include a plurality of heat radiation plates 72*a* arranged at a specific interval G (refer to FIG. 7) in a longitudinal direction of the condenser 72, for making heat radiation smooth.

The nozzle 110 may spray water supplied through the direct water pipe 101 toward the condenser 72. The water sprayed to the condenser 72 may evaporate by the intense heat generated from the condenser 72 on the moment that it contacts the surface of the condenser 72, and may be converted into steam.

The generated steam may mainly gather in a space 53*c* formed by the supply duct 53 provided in the downstream of the condenser 72, and may be suctioned into the blast duct 54 by the blast fan 41, and may then be provided to the inside of the drum 30 via the blast duct 54. The laundry put into the drum 30 may be sterilized by stem, and crinkles and wrinkles may be alleviated.

As the steam generator 100 uses the condenser 72 of the heat pump 70 for providing hot wind for drying of laundry as a heat source, there is no need to add a separate heat source for generating steam. Also, the steam generator 100 may include a nozzle 110 of a thin and long shape at a specific interval, which is arranged on the upper side of the condenser 72. Accordingly, there is no need to provide a wide space for arrangement in the inside of the washing machine for arranging the steam generator 100, and thus the space inside the washing machine can be utilized effectively.

Figure 5:
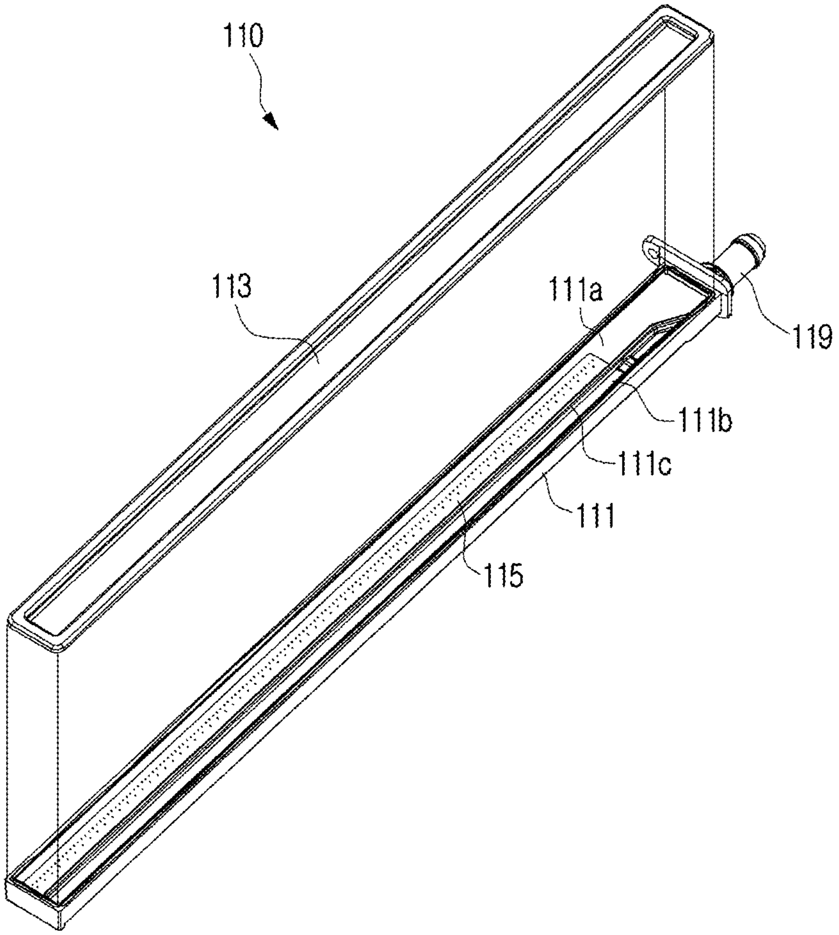
FIG. 5 is an exploded perspective view illustrating a nozzle of a steam generator according to one or more embodiments of the disclosure.
Figure 6:
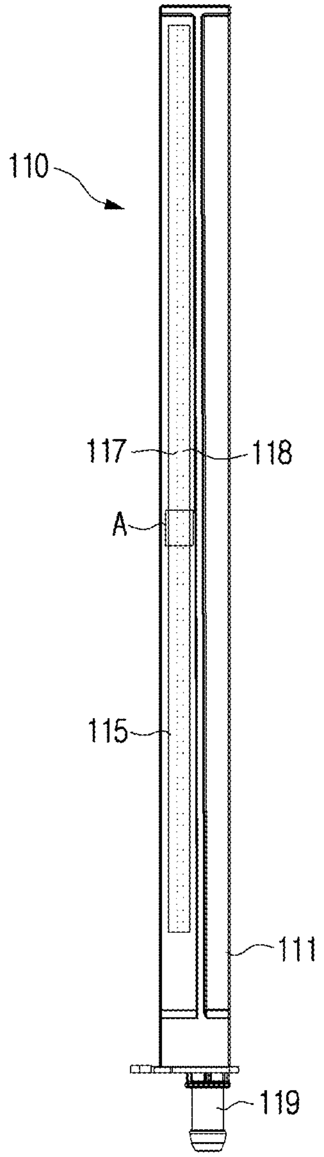
FIG. 6 is an exploded bottom view illustrating a nozzle of a steam generator according to one or more embodiments of the disclosure.
Figure 7:
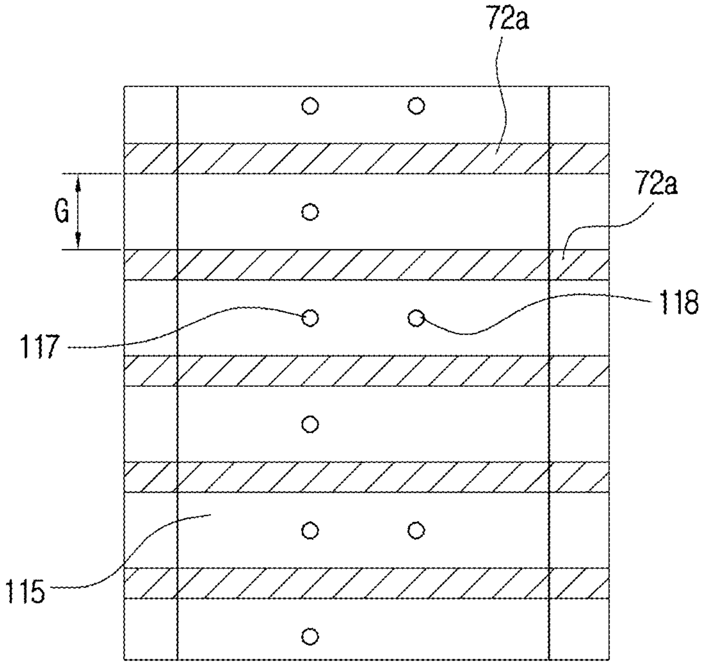
FIG. 7 is a diagram that enlarged the A part illustrated in FIG. 6.

FIG. 5 is an exploded perspective view illustrating a nozzle of a steam generator according to one or more embodiments of the disclosure. FIG. 6 is an exploded bottom view illustrating a nozzle of a steam generator according to one or more embodiments of the disclosure. FIG. 7 is a diagram that enlarged the A part illustrated in FIG. 6.

Referring to FIG. 5, the nozzle 110 may include a housing 111 and a cover 113 covering the opened upper part of the housing 111.

In the housing 111, an inlet port 119 connected with a direct pipe 101 may be provided on one side. The housing 111 may include a first space 111*a* and a second space 111*b* wherein water introduced into the inner side of the housing 111 through the direct water pipe 101 is temporarily stored. The first space 111*a* and the second space 111*b* may be divided by a partition wall 111*c*. In this case, if the level of the water supplied to the inside of the housing 111 is higher than the height of the partition wall 111*c*, the water in the second space 111*b* may be introduced into the first space 111*a*.

Referring to FIG. 6, the housing 111 may include a nozzle plate 115 constituting the bottom of the housing 111. The nozzle plate 115 may be formed integrally with the housing 111 as it is insert injection molded to the housing 111.

In the nozzle plate 115, a plurality of spray holes 117, 118 may be arranged in two rows at an interval along the longitudinal direction of the housing 111.

Referring to FIG. 7, the number of the plurality of spray holes 117 of the first row and the number of the plurality of spray holes 118 of the second row may be different. For example, the number of the plurality of spray holes 118 of the second row may be about ½ of the number of the plurality of spray holes 117 of the first row. As the diameters of the plurality of spray holes 117 of the first row are small, the spray holes may be blocked by foreign substances included in the direct water. In the disclosure, by providing the plurality of spray holes 118 of the second row on the nozzle plate 115, a phenomenon wherein the amount of generated steam decreases in case some of the plurality of spray holes 117 of the first row are blocked can be prevented.

The plurality of spray holes 118 of the second row are not limited thereto, and they may be provided in the same number as the plurality of spray holes 117 of the first row. In this case, the plurality of spray holes 118 of the second row may be arranged to correspond to the plurality of spray holes 117 of the first row.

The plurality of spray holes 117, 118 are provided in two rows in the nozzle plate 115. However, the spray holes are not limited thereto, and they may be formed in one row, or formed in three or more rows. As heat increases, the water spraying amount of the plurality of spray holes may also increase. If the water spraying amount increases, the generation amount of steam may also increase. Like this, the steam generator 100 may adjust the generation amount of steam with the entire number of the plurality of spray holes 117, 118.

Each of the plurality of spray holes 117 of the first row may be located between two adjacent heat radiation plates 72*a* as in FIG. 7. Accordingly, water sprayed from the plurality of spray holes 117 of the first row may be arranged in a location that does not correspond to the upper ends of the heat radiation plates 72*a*. Each of the plurality of spray holes 118 of the second row may also be located between two adjacent heat radiation plates 72*a* like the plurality of spray holes 117 of the first row. Accordingly, water sprayed from the plurality of spray holes 117, 118 of the first row and the second row contacts the surface of the condenser 72 without being interfered by the heat radiation plates 72*a*, and thus evaporation can be performed smoothly.

The diameters of the plurality of spray holes 117 of the first row may be about from 0.2 mm to 1.0 mm. The diameters of the plurality of spray holes 118 of the second row may also be about from 0.2 mm to 1.0 mm. In this case, the interval G of two adjacent heat radiation plates 72*a* may be, for example, from about 1.5 mm to 2.5 mm.

For example, in case the plurality of spray holes 117, 118 of the first row and the second row are in locations corresponding to the plurality of heat radiation plates 72*a*, some of the water sprayed from the plurality of spray holes 117, 118 may evaporate as the water flows down along the heat radiation plates 72*a*, but the rest of the water may be introduced into the drum 30 without evaporating. Due to this, the moisture that did not evaporate may increase the humidity inside the drum 30, and thereby reduce the drying efficiency of laundry, and the moisture may also be combined with lint and remain within the flow channel through which steam is supplied, causing bad odor.

The plurality of spray holes 118 of the second row may be arranged in locations that are shifted by a specific distance to the side with respect to the plurality of spray holes 117 of the first row. In this case, when installing the nozzle 110 inside the washing machine 1, in case each of the plurality of spray holes 117 of the first row is not arranged between two adjacent heat radiation plates 72*a* but comes to a location corresponding to the upper ends of the heat radiation plates 72*a* due to an assembly clearance, the plurality of spray holes 118 of the second row may be arranged between two adjacent heat radiation plates 72*a*, and thus the generation amount of steam can be maintained.

The plurality of spray holes 117, 118 may have small diameters (from about 0.2 mm to 1.0 mm), and thus water introduced into the first space 111*a* and the second space 111*b* of the housing 111 may pass through the plurality of spray holes 117, 118 by the water pressure of direct water, and may be sprayed to the condenser 72.

Figure 8:
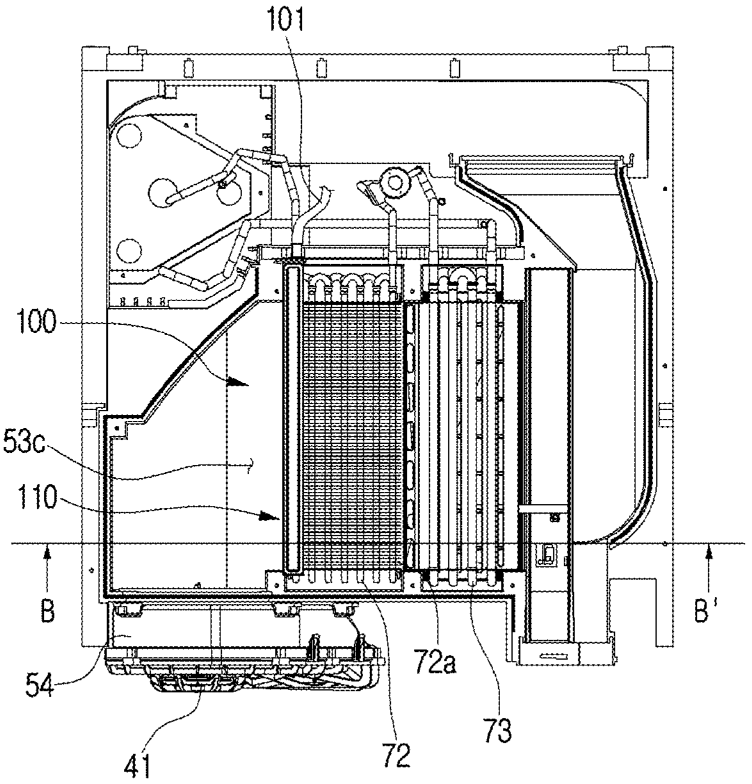
FIG. 8 is a plan view of a washing machine with a dryer wherein ducts of the washing machine with a dryer were removed according to one or more embodiments of the disclosure.
Figure 9:
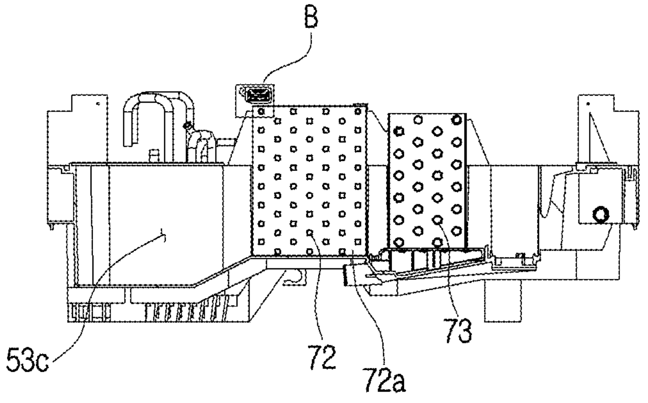
FIG. 9 is a cross-sectional view illustrated along the B-B' line illustrated in FIG. 8.
Figure 10:
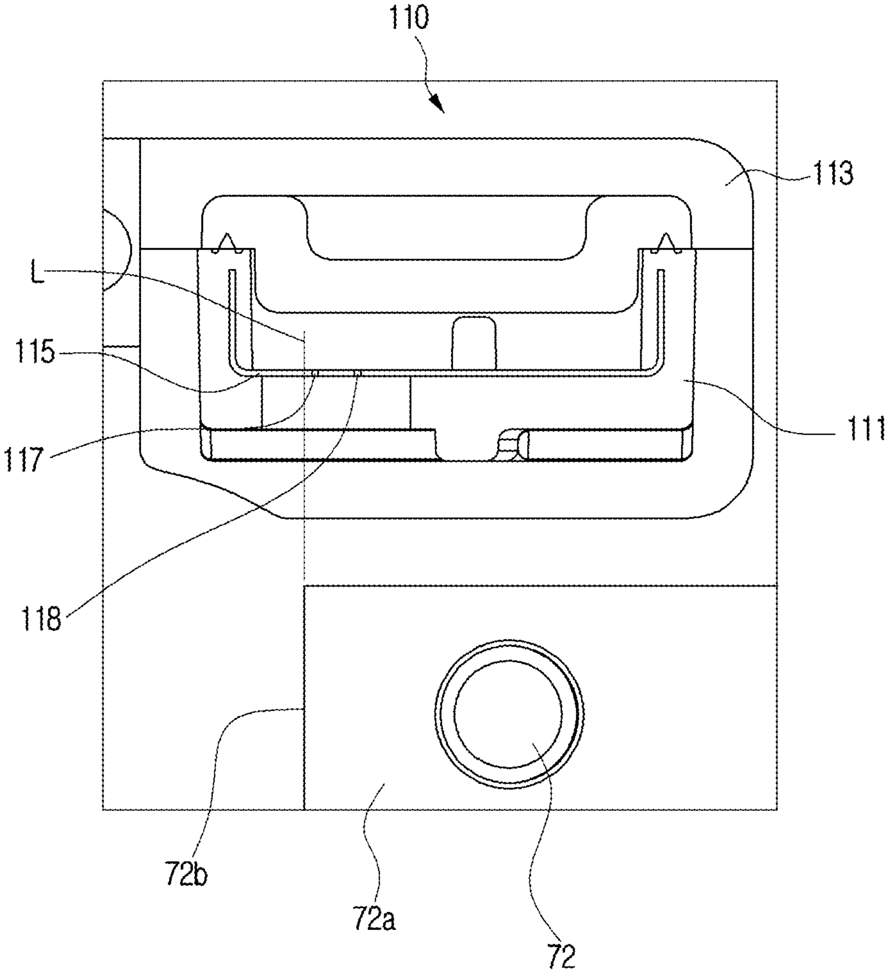
FIG. 10 is a diagram that enlarged the C part illustrated in FIG. 9.

FIG. 8 is a plan view of a washing machine with a dryer wherein ducts of the washing machine with a dryer were removed according to one or more embodiments of the disclosure. FIG. 9 is a cross-sectional view illustrated along the B-B' line illustrated in FIG. 8. FIG. 10 is a diagram that enlarged the C part illustrated in FIG. 9.

Referring to FIG. 8, the nozzle 110 may be arranged along the longitudinal direction of the condenser 72. The length of the nozzle 110 may approximately correspond to the length of the condenser 72.

Referring to FIGS. 9 and 10, the plurality of spray holes 117 of the first row may be arranged more downstream than the plurality of spray holes of the second row based on the flow of an air current passing through the condenser 72. In this case, the plurality of spray holes 117 of the first row may be arranged toward the inside of the edge 72*b* of the heat radiation plate 72*a*.

For example, as in FIG. 10, the plurality of spray holes 117 of the first row may be arranged on the upstream side of the condenser 72 based on a virtual line L extended to the edge 72*b* of the heat radiation plate 72*a*. In case the plurality of spray holes 117 of the first row go beyond the virtual line L and are located on the side of the space 53*c* of the supply duct 53, water sprayed from the plurality of spray holes 117 of the first row may not contact the surface of the condenser 72, and may thus be suctioned into the inside of the drum 30 as it is by the suctioning force of the blast fan 41 without evaporating. In this case, the humidity inside the drum 30 increases, and thus the drying efficiency of laundry may be reduced.

While the disclosure has been illustrated and described with reference to various embodiments in the above, a person having ordinary knowledge in the technical field to which the disclosure belongs would be able to understand that various modifications may be made in the embodiments and the details of the disclosure, without departing from the scope and idea of the disclosure defined by the appended claims and the equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A washing machine with a dryer comprising:

a cabinet wherein a laundry inlet is provided on a front surface thereof;

a tub arranged inside the cabinet, and including a front opening and a rear opening connected with the laundry inlet;

a drum configured to rotate inside the tub;

a heat pump including an evaporator, a compressor, a condenser, and an expansion valve so as to heat air provided to an inside of the drum;

a steam generator configured to spray water to the condenser and generate steam by heat generated from the condenser; and a blast fan provided on a steam supply flow channel continued from the condenser to the drum, and configured to transfer the steam generated at the steam generator to the inside of the drum.

2. The washing machine with the dryer of claim 1, wherein the steam generator further comprises:

a nozzle arranged on an upper side of the condenser, and is arranged to be slanted toward one side of the condenser to be adjacent to a space provided between the condenser and the blast fan.

3. The washing machine with the dryer of claim 2, wherein:

the nozzle comprises:

a housing arranged along a longitudinal direction of the condenser;

a cover covering an opened upper part of the housing; and a nozzle plate that constitutes a bottom of the housing, and a plurality of spray holes are provided along a longitudinal direction of the housing.

4. The washing machine with the dryer of claim 3, wherein:

the condenser comprises a plurality of heat radiation plates arranged at a specific interval along the longitudinal direction of the condenser, the plurality of spray holes comprise a plurality of spray holes of a first row arranged at a specific interval along the longitudinal direction of the housing, and each of the plurality of spray holes of the first row is arranged between two adjacent heat radiation plates among the plurality of heat radiation plates.

5. The washing machine with the dryer of claim 4, wherein the plurality of spray holes of the first row are arranged toward an inside of the condenser based on edges of the plurality of heat radiation plates.

6. The washing machine with the dryer of claim 5, wherein the plurality of spray holes further comprise a plurality of spray holes of a second row arranged more toward the inside of the condenser than the plurality of spray holes of the first row.

7. The washing machine with the dryer of claim 6, wherein the plurality of spray holes of the second row respectively correspond to the plurality of spray holes of the first row.

8. The washing machine with the dryer of claim 7, wherein a number of the plurality of spray holes of the second row is fewer than a number of the plurality of spray holes of the first row.

9. The washing machine with the dryer of claim 6, wherein each of the plurality of spray holes of the second row is arranged between two adjacent heat radiation plates.

10. The washing machine with the dryer of claim 9, wherein the plurality of spray holes of the second row are shifted toward one side with respect to the plurality of spray holes of the first row.

11. The washing machine with the dryer of claim 4, wherein an interval of the two adjacent heat radiation plates is from 1.5 mm to 2.5 mm.

12. The washing machine with the dryer of claim 11, wherein diameters of the plurality of spray holes of the first row are from 0.2 mm to 1.0 mm.

13. A washing machine with a dryer comprising:
- a cabinet;
- a tub arranged inside the cabinet, and wherein a front opening and a rear opening connected with a laundry inlet of the cabinet are provided;
- a drum configured to rotate inside the tub;
- a heat pump configured to heat air provided to an inside of the drum;
- a steam generator that comprises a plurality of spray holes spraying water to some parts of the heat pump, and configured to generate steam by heat generated from some parts of the heat pump; and
- a blast fan configured to transfer the steam generated at the steam generator to the inside of the drum,
- wherein some parts of the heat pump comprise a plurality of heat radiation plates arranged at a specific interval along a longitudinal direction, and
- wherein each of the plurality of spray holes is arranged between two adjacent heat radiation plates among the plurality of heat radiation plates.

14. The washing machine with the dryer of claim 13, wherein the plurality of spray holes are arranged toward the inside of some parts of the heat pump based on edges of the plurality of heat radiation plates.

15. The washing machine with the dryer of claim 14, wherein the steam generator further comprises:
- a plurality of additional spray holes of at least one row that are arranged farther from the edges of the plurality of heat radiation plates than the plurality of spray holes.

16. The washing machine with the dryer of claim 13, wherein the steam generator further comprises:
- a nozzle arranged on an upper side of a condenser of the steam generator, and is arranged to be slanted toward one side of the condenser to be adjacent to a space provided between the condenser and the blast fan.

17. The washing machine with the dryer of claim 16, wherein:
- the nozzle comprises:
  - a housing arranged along a longitudinal direction of the condenser;
  - a cover covering an opened upper part of the housing; and
  - a nozzle plate that constitutes a bottom of the housing, and
- the plurality of spray holes are provided along a longitudinal direction of the housing.

18. The washing machine with the dryer of claim 17, wherein:
- the condenser comprises the plurality of heat radiation plates arranged at a specific interval along the longitudinal direction of the condenser,
- the plurality of spray holes comprise a plurality of spray holes of a first row arranged at a specific interval along the longitudinal direction of the housing.

19. The washing machine with the dryer of claim 18, wherein the plurality of spray holes of the first row are arranged toward an inside of the condenser based on edges of the plurality of heat radiation plates.

20. The washing machine with the dryer of claim 19, wherein the plurality of spray holes further comprise a plurality of spray holes of a second row arranged more toward the inside of the condenser than the plurality of spray holes of the first row.

* * * * *